United States Patent [19]

Neki et al.

[11] 4,377,778
[45] Mar. 22, 1983

[54] SEWING MACHINE SPEED CONTROL SYSTEM HAVING QUICK RESPONSE CHARACTERISTIC

[75] Inventors: Shigeo Neki, Osaka; Nozomu Shinozaki; Takashi Dohi, both of Hirakata, all of Japan

[73] Assignee: Matsushita Electric Industrial Company, Limited, Osaka, Japan

[21] Appl. No.: 199,705

[22] Filed: Oct. 23, 1980

[30] Foreign Application Priority Data

Oct. 26, 1979 [JP] Japan .............................. 54-139073

[51] Int. Cl.$^3$ .............................................. H02P 5/16
[52] U.S. Cl. .................................. 318/341; 318/318; 318/345 E
[58] Field of Search ............... 318/269, 270, 310, 313, 318/318, 327, 329, 341, 345 E

[56] References Cited

U.S. PATENT DOCUMENTS

| | | | |
|---|---|---|---|
| 2,782,355 | 2/1957 | Wilcox | 318/318 |
| 3,268,788 | 8/1966 | Branco | 318/313 |
| 3,532,953 | 10/1970 | Daab et al. | 318/269 |
| 3,731,301 | 5/1973 | Davis | 318/313 X |
| 4,218,735 | 8/1980 | McCutcheon | 318/329 X |
| 4,298,832 | 11/1981 | Acker et al. | 318/318 |

FOREIGN PATENT DOCUMENTS

WO80/02780 6/1979 PCT Int'l Appl. ................ 318/318

OTHER PUBLICATIONS

"Microprocessor-Based Current Controller" by Chan et al., IEEE-Industrial Electronics; vol. IECI-27, No. 3. 8/80; pp. 169-176.

*Primary Examiner*—Stanley J. Witkowski
*Assistant Examiner*—Richard M. Moose
*Attorney, Agent, or Firm*—Lowe, King, Price & Becker

[57] ABSTRACT

A digital speed control system for a sewing machine comprises a digital speed setting device which responds to manual depression of a foot pedal by generating a digital position signal. A variable frequency divider divides the frequency of speed related pulses so that its output frequency is an integral submultiple of the input frequency, which is variable as a function of the digital position signal. A period detector senses the interval between pulses that occur successively at the output of the frequency divider and generates binary data representing the sensed interval. The interval-representing data is translated into a second period data in an arithmetic unit according to a predetermined transfer function. The arithmetic unit provides correction of the most recently sensed pulse interval according to the direction and amount of the deviation of the most recent pulse interval with respect to the preceding pulse interval, whereby the second period data is accordingly modified by an amount proportional to the rate of sewing speed variation. A pulse generator translates the second period data into pulse for activating a magnetic clutch or a magnetic brake depending on a sign of the second period data to accelerate or decelerate the sewing machine.

10 Claims, 4 Drawing Figures

4,377,778

SEWING MACHINE SPEED CONTROL SYSTEM HAVING QUICK RESPONSE CHARACTERISTIC

BACKGROUND OF THE INVENTION

The present invention relates to sewing machine speed control systems, and in particular to a digital sewing machine speed control system in which machine speed is rapidly controlled in response to a sudden occurrence of load change.

Our corresponding U.S. patent application (later filled) discloses a digital speed control system for sewing machines which comprises a digital pedal depression sensor and a programmable frequency divider which divides the frequency of speed indicative pulses by an integral multiple that is a function of a digital signal supplied from the depression sensor. A period detector is provided to measure the interval between successively generated pulses from the frequency divider. The sewing machine is driven by a motor which includes magnetically operated clutch and brake means which are respectively energized by a pulse having a duration that is a function of the measured interval. The measured interval is represented by binary data which is applied to a digital arithmetic circuit that translates the input binary data into period data according to a predetermined transfer function describing the relationship between the measured interval and a period in which the clutch or brake means is energized. The digital pedal depression sensor includes a digital coding plate which is movable with the foot pedal with respect to sensing device to generate position signals.

When the frequency division ratio of the programmable divider is changed in response to a change in pedal position in the speed increase direction, the pulse interval of the frequency divider is multiplied according to the change in frequency division ratio. The arithmetic circuit provides a period data which increases the duty cycle of the clutch means. The sewing machine speed increases until the measured pulse interval reaches the previous value. When the sewing machine is stabilized at the changed frequency division ratio, the pulse interval of the frequency divider is maintained constant.

It is of particular importance that the speed control system for sewing machines respond quickly to a sudden change in sewing load so that the sewing machine quickly returns to the nominal speed, which is thus maintained constant under varying load.

The copending United States application is unsatisfactory in respect of the speed response characteristics because the transfer function of the arithmetic circuit takes into account only one input variable, i.e. the pulse interval of the frequency divider.

SUMMARY OF THE INVENTION

Accordingly, an object of the present invention is to provide a digital speed control system for sewing machines which allows the sewing machine to rapidly respond to sudden load variations so that the normal sewing speed is always maintained under varying loading conditions.

The present invention is an improvement over the aforesaid copending U.S. application and provides an arithmetic circuit having a transfer function which takes into account two input variables. Preferably, two latching circuits are successively connected to the output of the pulse interval detector which is connected to the frequency divider. A first latch provides preceding-pulse interval data and a second latch provides most-recent-pulse-interval data. The arithmetic circuit detects the amount and direction of the deviation of the most recent pulse interval from the preceding pulse interval and modifies the most-recent-pulse-interval data in accordance with the detected deviation. As a result, the pulse data derived from the arithmetic circuit and hence the duty cycle of the clutch or brake means is varied in an amount proportional to the rate of speed variation of the sewing machine.

BRIEF DESCRIPTION OF THE DRAWINGS

The features and advantages of the invention will become apparent from the following description when read in conjunction with the accompanying drawings, in which.

DETAILED DESCRIPTION

Figure 1:
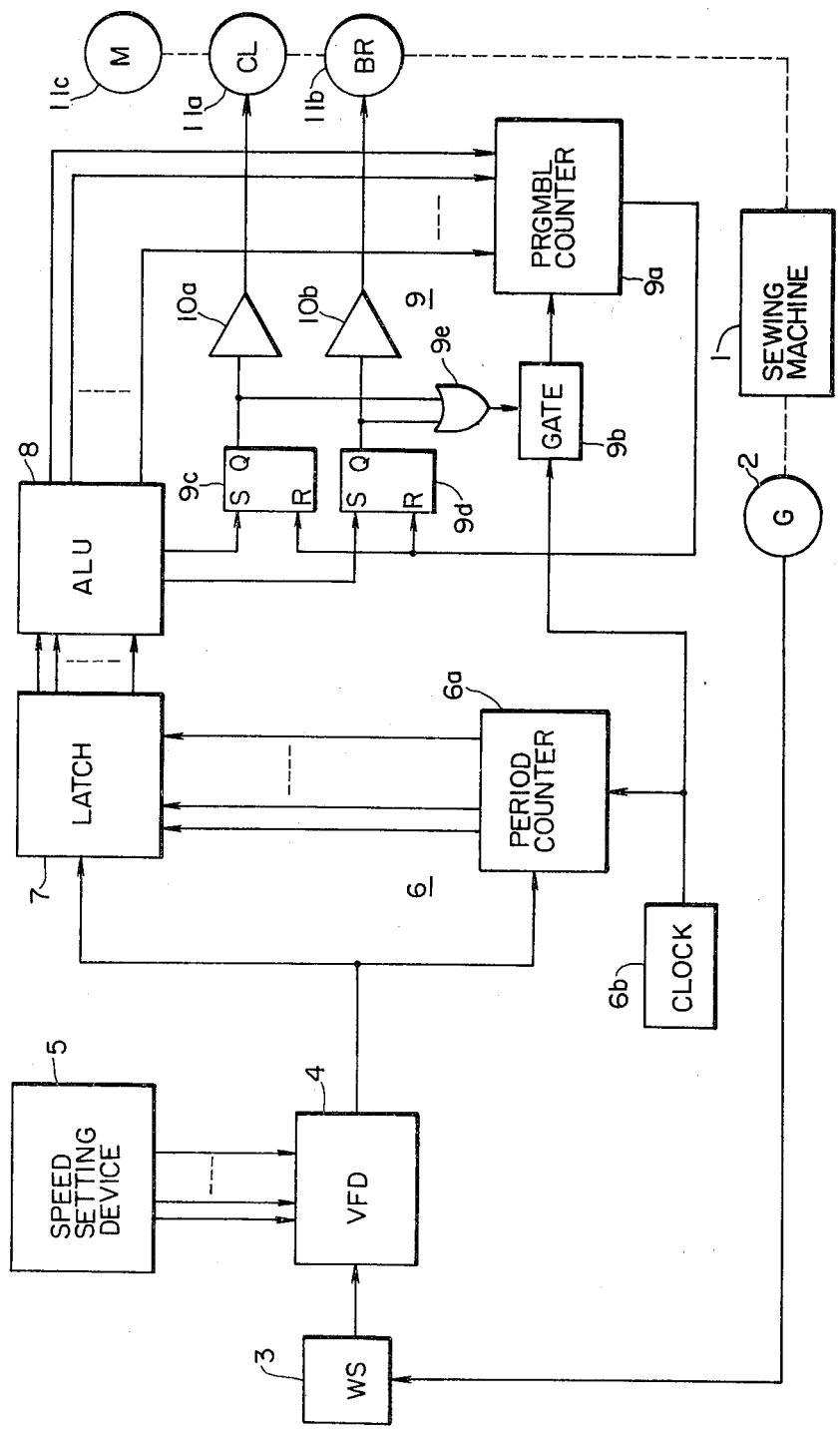
FIG. 1 is a schematic illustration of the basic block diagram of the digital speed control system of the invention.

Referring now to FIG. 1, a basic circuit of the sewing machine speed control system of the invention is schematically illustrated. The system includes a sewing machine speed setting device 5 which provides a digital speed setting signal according to the amount of depression of a conventional foot pedal, not shown. An impulse generator 2 of a conventional construction has its rotor operatively connected to the driven shaft of the sewing machine 1 which is driven by a motor 11c. This motor has a driving shaft which is coupled to the driven shaft of the sewing machine by a pulley-and-belt arrangement when a clutch actuating coil 11a is energized. The rotor shaft of motor M is decoupled from the sewing machine by a brake actuating coil 11b which subsequently applies a brake to the driven shaft of the sewing machine. Thus the speed of the sewing machine is controlled by varying the period of energization of coils 11a and 11b. Since the details of the motor construction are well known in the art, FIG. 1 only illustrates the associated parts in schematic form for simplicity. Impulse generator 2 generates a train of 60 equally spaced apart impulses per revolution when the rotor turns at a speed of 200 rpm. The generated impulses are shaped into rectangular pulses by a wave shaping circuit 3 and applied to a variable frequency divider 4. Frequency divider 4 has its program control inputs connected to receive digital signals from the speed setting device 5 so that its output frequency is an integral submultiple of its input frequency which is the division ratio represented by the signal from the setting device 5.

The output of frequency divider 4 is applied to a period detector 6 formed by a period counter 6a and a clock source 6b. The period counter is pulsed at each clock and reset in response to the output of frequency divider 4 to provide an output that is a binary representation of the clock count during the interval between successive pulses from variable frequency divider 4.

Outputs of period counter 6a are presented to a latch 7 in response to each pulse from frequency divider 4 and thence to an arithmetic unit or function generator 8 having a predetermined transfer function describing the relationship between the interval detected by period detector 6 and a period during which each one of coils 11a and 11b is energized during an interval subsequent to the interval detected by period detector 6. As will be described in detail hereinbelow, arithmetic unit 8 provides an acceleration or deceleration signal when the detected interval is greater than a predetermined value or not, and also provides output period data to a period generator 9. Period generator 9 comprises a programmable counter 9a which receives the period data from arithmetic unit 8 to preset its full count value and is pulsed at each clock from source 6b. Further included are a gate 9b, flip-flops 9c and 9d and an OR gate 9e. Flip-flops 9c and 9d respond respectively to acceleration and deceleration signals from arithmetic unit 8 to activate coils 11a and 11b through linear amplifiers 10a and 10b. The outputs of flip-flops 9c and 9d are coupled via OR gate 9e to the control terminal of gate 9b to pass clock pulses from source 6b to programmable counter 9a. Gate 9b is thus open in response to each of the acceleration and deceleration to cause programmable counter 9a to initiate counting operation. On full count, programmable counter 9a resets flip-flops 9c and 9d. Thus, flip-flops 9c and 9d each remain in a logical one state during an interval that is a function of the output period data from arithmetic unit 8, and clutch and brake coils 11a and 11b are correspondingly energized.

Figure 2:
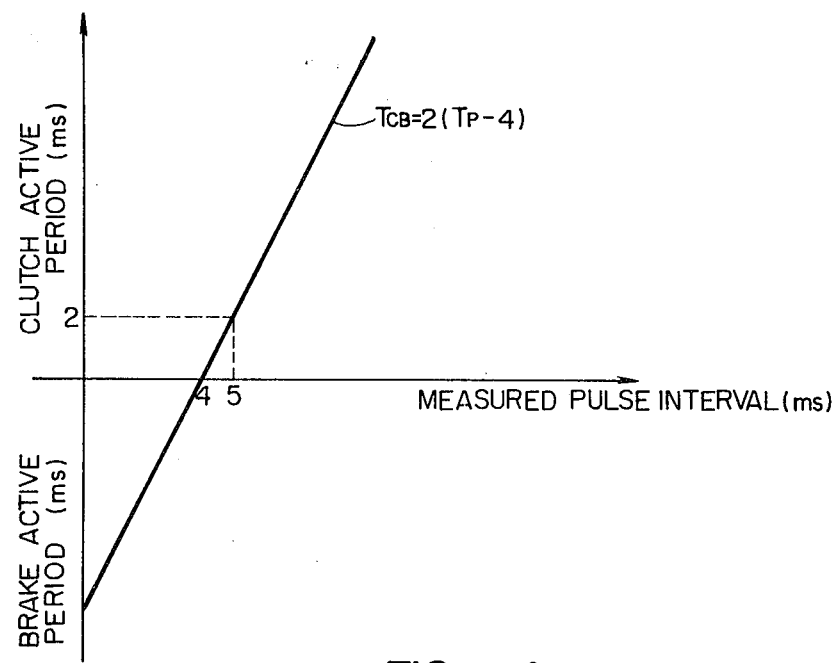
FIG. 2 is a graphic illustration of a transfer function which describes the relationship between the interval between successively generated speed pulses and energization period in which the magnetic clutch or brake is operated.

The basic operation of the speed control system of FIG. 1 will be better understood from the following description by reference to FIG. 2. FIG. 2 is a graphic representation of the transfer function according to which arithmetic unit 8 provides translation of input data. This transfer function is described by the following Equation:

$$T_{CB} = A(T_P - B) \quad (1)$$

where, $T_{CB}$ represents the period during which coil 11a or 11b is energized, $T_P$ representing the period detected by period detector 6, and A and B are constants. Constant A is a factor that determines the response characteristic of the speed control system, and B is appropriately determined to set the minimum speed of the sewing machine when the frequency division ratio of divider 4 is unity. Typical values of constants A and B are selected to have integers 2 and 4, respectively.

With the frequency division ratio being adjusted at a unity value by the setting device 5, impulse generator 2 generates 60 impulses per revolution for a sewing machine speed of 200 rpm. The interval $T_P$ detected by period counter 6a is 5 milliseconds as seen in FIG. 2 which corresponds to a 2-millisecond period for the $T_{CB}$ value. This means that magnetic clutch 11a is energized with a duty cycle of 40% during a subsequent interval between successive pulses from variable frequency divider 4.

If sewing machine load has increased, causing its speed to decrease, with a resultant increase in the detected pulse interval $T_P$ by an amount determined by Equation (1), an acceleration signal is generated from arithmetic unit 8 to trigger flip-flop 9c, so that clutch coil 11a is energized with a duty cycle greater than 40%. Since sewing machine speed is proportional to an average value of clutch energization periods, an increase in duty cycle accelerates the sewing machine until it reaches 200 rpm. Conversely, a decrease in sewing machine load results in a decrease in duty cycle for clutch energization until sewing machine speed decreases to 200 rpm. If the machine speed has increased to a point above 250 rpm which corresponds to a 4-millisecond interval for $T_P$, a deceleration signal is provided by arithmetic unit 8 which triggers flip-flop 9d to energize magnetic brake 11b. As a result, the sewing machine speed rapidly decreases to 200 rpm.

If the setting device 5 is adjusted by depression of the foot pedal to vary the division ratio from unity to ½, the interval $T_P$ is doubled with a corresponding increase in clutch duty cycle. In response to this transient the sewing machine speed increases until it reaches 400 rpm at which point the system is again stabilized. With the system so stabilized, the pulse interval $T_P$ and hence the duty cycle assumes the same value as when the sewing machine was run at 200 rpm, so that the $T_P$ and duty cycle values are maintained constant regardless of transient conditions once the system is stabilized at a new division ratio. The operating speed of sewing machine 1 can thus be varied at increments of an integral multiple of 200 rpm corresponding to the frequency division ratio set by device 5.

Although the speed control system of FIG. 1 ensures the sewing machine to stabilize to a constant speed in response to transient conditions, the present invention provides a speed correction signal to allow the sewing machine to more quickly respond to transients.

Figure 3:
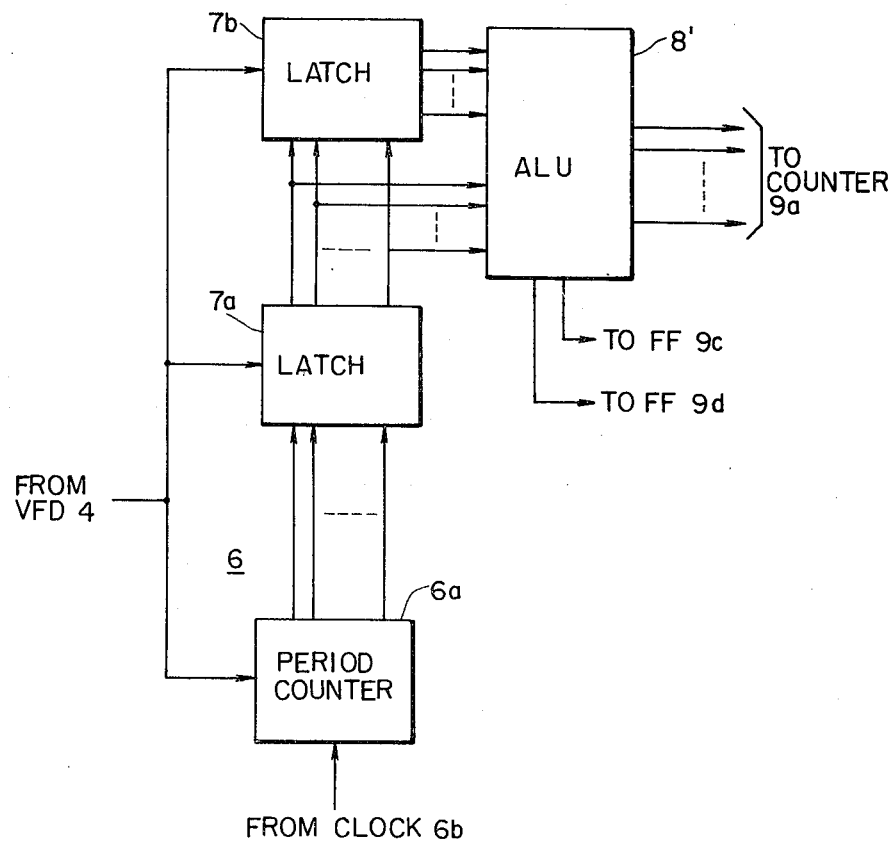
FIG. 3 is an illustration of the modification of the basic embodiment of the invention.

To this end, the system of FIG. 1 is modified as shown in FIG. 3 in which two latching circuits 7a and 7b are provided. The latch 7a receives its inputs from the period counter 6a to provide a period data $T_{P2}$ to the arithmetic unit 8' and also to the latch 7b which provides a period data $T_{P1}$ to the arithmetic unit 8'. These period data are successively generated so that $T_{P2}$ represents the period data which follows the data $T_{P1}$. The arithmetic unit 8' has a transfer function which is described as follows:

$$T_{CB} = A(T_{P2} + \Delta T_P - B) \quad (2)$$

where $\Delta T_P$ represents $(T_{P2} - T_{P1})$. This difference value indicates the amount of correction to be made in response to transients. If the sewing machine speed decreases the correction value has a positive sign to increase $T_{CB}$ and if it increases the correction value assumes a negative sign to decrease $T_{CB}$.

The operation of the modified speed control system of FIG. 3 will be better understood from the description given below.

Figure 4:
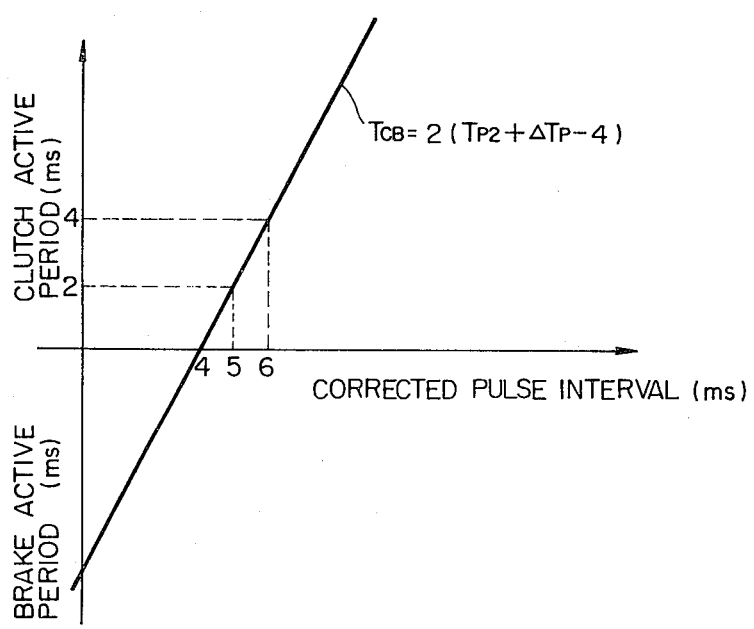
FIG. 4 is a graphic illustration useful for describing the operation of the embodiment of FIG. 3.

If the sewing machine speed has decreased so that the preceding and following pulse intervals $T_{P1}$ and $T_{P2}$ are respectively 4 milliseconds and 5 milliseconds, the corrected interval becomes 6 milliseconds which corresponds to $T_P$ of Equation (1). Therefore, the clutch coil 11a is activated for an interval of 4 milliseconds as seen in FIG. 4.

It can be seen from the above that the speed control system as taught by the embodiment of FIG. 3 allows the arithmetic unit 8' to generate a clutch active data representing an interval greater than the subsequent pulse interval if the sewing machine speed is rapidly decreased by a sudden increase in sewing load, so that the clutch coil 11a is continuously activated to meet the sudden load increase. Conversely, a sudden decrease in sewing load will cause the arithmetic unit 8' to generate a brake active data representing an interval greater than the subsequent pulse interval, so that the brake coil 11b is continuously activated to meet the sudden load decrease until the constant speed value is reached.

Various modifications are apparent to those skilled in the art without departing from the scope and content of the present invention which is only limited by the appended claims. For example, the transfer function with which the arithmetic unit of the invention executes input period data can be modified to specific characteristics of sewing machine.

What is claimed is:

1. A closed-loop speed control system for controlling the speed of a moving object at a constant speed under varying loading condition, comprising:
    an accelerating means for coupling the motive power of a prime mover to said moving object and a decelerating means for decelerating said moving object;
    a tachogenerator means for generating pulses at a frequency proportional to the speed of the moving object,
    a counter means for measuring the interval between successive pulses generated by said tachogenerator means,
    a digital translating means coupled to said counter means for translating each measured interval according to a predetermined transfer function describing the relationship between the measured interval and a duration in which said moving object is to be subsequently accelerated or decelerated and for generating a first output signal in accordance with said transfer function when said measured interval is greater than a predetermined value corresponding to said constant speed and a second output signal when said measured interval is smaller than said predetermined value, and
    means for respectively converting said first and second output signals into first and second speed control pulses of said duration for application to said accelerating means and said decelerating means, respectively.

2. A closed-loop speed control system as claimed in claim 1, wherein said transfer function is described by a relation $T = a(t - b)$, where,
    $T$ = the duration in which one of said accelerating means or said decelerating means is energized;
    $a$ = a constant representing the loop gain of the control system;
    $t$ = the measured interval; and
    $b$ = a constant.

3. A closed-loop speed control system as claimed in claim 1, further comprising storage means for successively storing the output of said counter means, and wherein said digital translating means is operative to detect the difference between said successively stored counter means outputs and to correct said measured interval according to the detected difference before said interval is translated into said first and second output signals.

4. A closed-loop speed control system as claimed in claim 3, whereins aid transfer function is described by a relation $T = a(t + \Delta t - b)$, where,
    $T$ = the duration in which said accelerating means or said decelerating means is energized;
    $a$ = a constant representing the loop gain of the control system;
    $t$ = the measured interval;
    $\Delta t$ = the difference between said successively stored counter means outputs; and
    $b$ = a constant.

5. A closed-loop speed control system as claimed in claim 1, 2, 3 or 4, further comprising a variable frequency divider means for dividing the frequency of the pulses generated by said tachogenerator means for application to said counter means and a speed setting device for controlling the frequency division ratio of said variable frequency divider.

6. A sewing machine having a motor, comprising in a closed loop:
    a tachogenerator means for generating pulses at a frequency proportional to the operating speed of the sewing machine,
    a counter means for measuring the interval between successive pulses generated by said tachogenerator means,
    a digital translating means coupled to said counter means for translating each measured interval according to a predetermined transfer function describing the relationship between the measured interval and a duration in which the operating speed of said sewing machine is to be subsequently accelerated or decelerated and for generating a first output signal in accordance with said transfer function when said measured interval is greater than a predetermined value and a second output signal when said measured interval is smaller than said predetermined value,
    means for converting said first and second output signals into first and second speed control pulses of said duration respectively,
    a solenoid clutch means responsive to said first control pulse for transmitting the motive power of said motor to the sewing machine, and
    a solenoid brake means responsive to said second control pulse for applying braking to the sewing machine.

7. A sewing machine as claimed in claim 6, wherein said transfer function is described by a relation $T = a(t - b)$, where,
    $T$ = the duration in which one of said clutch means and said brake means is energized;
    $a$ = a constant representing the gain of the closed loop;
    $t$ = the measured interval; and
    $b$ = a constant.

8. A sewing machine as claimed in claim 6, further comprising storage means for successively storing the output of said counter means and wherein said digital translating means is operative to detect the difference between successively stored counter means outputs and to correct said measured interval according to said difference before said interval is translated into said first and second output signals.

9. A sewing machine as claimed in claim 8, wherein said transfer function is described by a relation $T = a(t + \Delta t - b)$,
    where $T$ = the duration in which one of said clutch means and said brake means is energized;
    $a$ = a constant representing the gain of the closed loop;
    $t$ = the measured interval
    $\Delta t$ = the difference between said successively stored counter means outputs; and
    $b$ = a constant.

10. A sewing machine as claimed in claim 6, 7, 8 or 9, further comprising a variable frequency divider means for dividing the frequency of said pulses generated by the tachogenerator means for application to said counter means and a speed setting device for controlling the frequency division ratio of said variable frequency divider for setting a reference speed at which the speed of said sewing machine is controlled.

* * * * *